United States Patent
Miller et al.

(10) Patent No.: US 9,293,264 B2
(45) Date of Patent: Mar. 22, 2016

(54) COMPLIANT ENERGY STORING STRUCTURAL SHEET

(71) Applicant: The Paper Battery Co., Troy, NY (US)

(72) Inventors: Robert J. Miller, Delmar, NY (US); Marsha Grade, Niskayuna, NY (US); Trevor J. Simmons, Rhinebeck, NY (US); Frank Kovacs, Clifton Park, NY (US); Amber Brooks, Clifton Park, NY (US); George Allen, Middle Grove, NY (US)

(73) Assignee: The Paper Battery Co., Troy, NY (US)

( * ) Notice: Subject to any disclaimer, the term of this patent is extended or adjusted under 35 U.S.C. 154(b) by 0 days.

(21) Appl. No.: 14/628,857

(22) Filed: Feb. 23, 2015

(65) Prior Publication Data

US 2015/0187507 A1     Jul. 2, 2015

Related U.S. Application Data

(62) Division of application No. 13/846,173, filed on Mar. 18, 2013, now Pat. No. 8,964,358, which is a division of application No. 12/844,787, filed on Jul. 27, 2010, now Pat. No. 8,514,548.

(60) Provisional application No. 61/228,831, filed on Jul. 27, 2009, provisional application No. 61/363,104, filed on Jul. 9, 2010, provisional application No. 61/364,667, filed on Jul. 15, 2010.

(51) Int. Cl.
*H01G 9/00* (2006.01)
*H01G 9/048* (2006.01)
(Continued)

(52) U.S. Cl.
CPC ............. *H01G 9/048* (2013.01); *H01G 9/004* (2013.01); *H01G 9/02* (2013.01); *H01G 9/155* (2013.01); *H01G 11/36* (2013.01); *H01M 2/22* (2013.01); *H01M 4/02* (2013.01); *H01M 4/0402* (2013.01); *H01M 4/0419* (2013.01); *H01M 4/08* (2013.01); *H01M 4/8828* (2013.01); *H01M 6/40* (2013.01); *H01M 8/0228* (2013.01); *H01M 8/0245* (2013.01); *H01M 14/00* (2013.01);
(Continued)

(58) Field of Classification Search
USPC ......... 361/502, 503–504, 509–512, 516–519, 361/523, 525, 528, 529
See application file for complete search history.

(56) References Cited

U.S. PATENT DOCUMENTS 6,456,484 B1    9/2002   Matsuoka et al.
6,594,138 B1    7/2003   Belyakov et al.
(Continued)

FOREIGN PATENT DOCUMENTS

EP     1995053 A1     11/2008

OTHER PUBLICATIONS

Pushpara, J. et al. "Flexible Energy Storage Devices Based on Nanocoposite Paper." Proceedings of the National Academy of Science, (2007), vol. 104 (34), pp. 13574-13577, entire document.

(Continued)

*Primary Examiner* — Nguyen T Ha
(74) *Attorney, Agent, or Firm* — Kevin P. Radigan, Esq.; Heslin Rothenberg Farley & Mesiti P.C.

(57) ABSTRACT

Disclosed herein is a structural sheet includes an energy storage density that is greater than 10-mWh/ft2 and is capable of withstanding greater than 5-KPa stress under at least 5% strain. Further provided is an energy storing structural sheet comprising an electrically conducting current carrying layer that is print formed over a sub assembly that comprises a separator, a foundation, an electrode, and a current bus.

9 Claims, 8 Drawing Sheets

(51) Int. Cl.
*H01G 9/02* (2006.01)
*H01G 11/36* (2013.01)
*H01M 2/22* (2006.01)
*H01M 4/02* (2006.01)
*H01M 4/04* (2006.01)
*H01M 4/08* (2006.01)
*H01M 4/88* (2006.01)
*H01M 6/40* (2006.01)
*H01M 8/02* (2006.01)
*H01M 14/00* (2006.01)
*H01G 9/004* (2006.01)

(52) U.S. Cl.
CPC .... *H01M14/005* (2013.01); *H01M 2300/0094* (2013.01); *Y02E 60/13* (2013.01); *Y02E 60/50* (2013.01)

(56) References Cited

U.S. PATENT DOCUMENTS

| | | | |
|---|---|---|---|
| 6,697,249 B2 | 2/2004 | Maletin et al. | |
| 6,804,108 B2 | 10/2004 | Nanjundiah et al. | |
| 7,612,985 B2 | 11/2009 | Dementiev et al. | |
| 7,864,507 B2 | 1/2011 | Fleig et al. | |
| 7,923,151 B2 | 4/2011 | Lam et al. | |
| 8,178,155 B2 | 5/2012 | Patibandla | |
| 8,373,971 B2 * | 2/2013 | Young | H01G 9/016 361/502 |
| 8,514,548 B2 | 8/2013 | Miller et al. | |
| 2005/0041366 A1 | 2/2005 | Breven et al. | |
| 2007/0121274 A1 | 5/2007 | Talvacchio et al. | |
| 2008/0180875 A1 | 7/2008 | Biggs et al. | |
| 2011/0051320 A1 | 3/2011 | Miller et al. | |
| 2011/0052910 A1 * | 3/2011 | Gunnink | B32B 15/14 428/337 |

OTHER PUBLICATIONS

Application No. PCT/US2010/043445, International Search Report and Written Opinion of the International Searching Authority, or the Declaration Dated Nov. 18, 2010. 18 pages.

The Paper Battery Co. et al; Application No. PCT/US2010/043445, International Filing Date; Jul. 27, 2010; International Preliminary Report on Patentability dated Jan. 31, 2012; 7 pages.

Non-Final Office Action for U.S. Appl. No. 13/846,173, mailed Jul. 18, 2014.

Notice of Allowance for U.S. Appl. No. 13/846,173, mailed Oct. 14, 2014.

Application for U.S. Appl. No. 13/846,173, filed on Mar. 18, 2013.

* cited by examiner

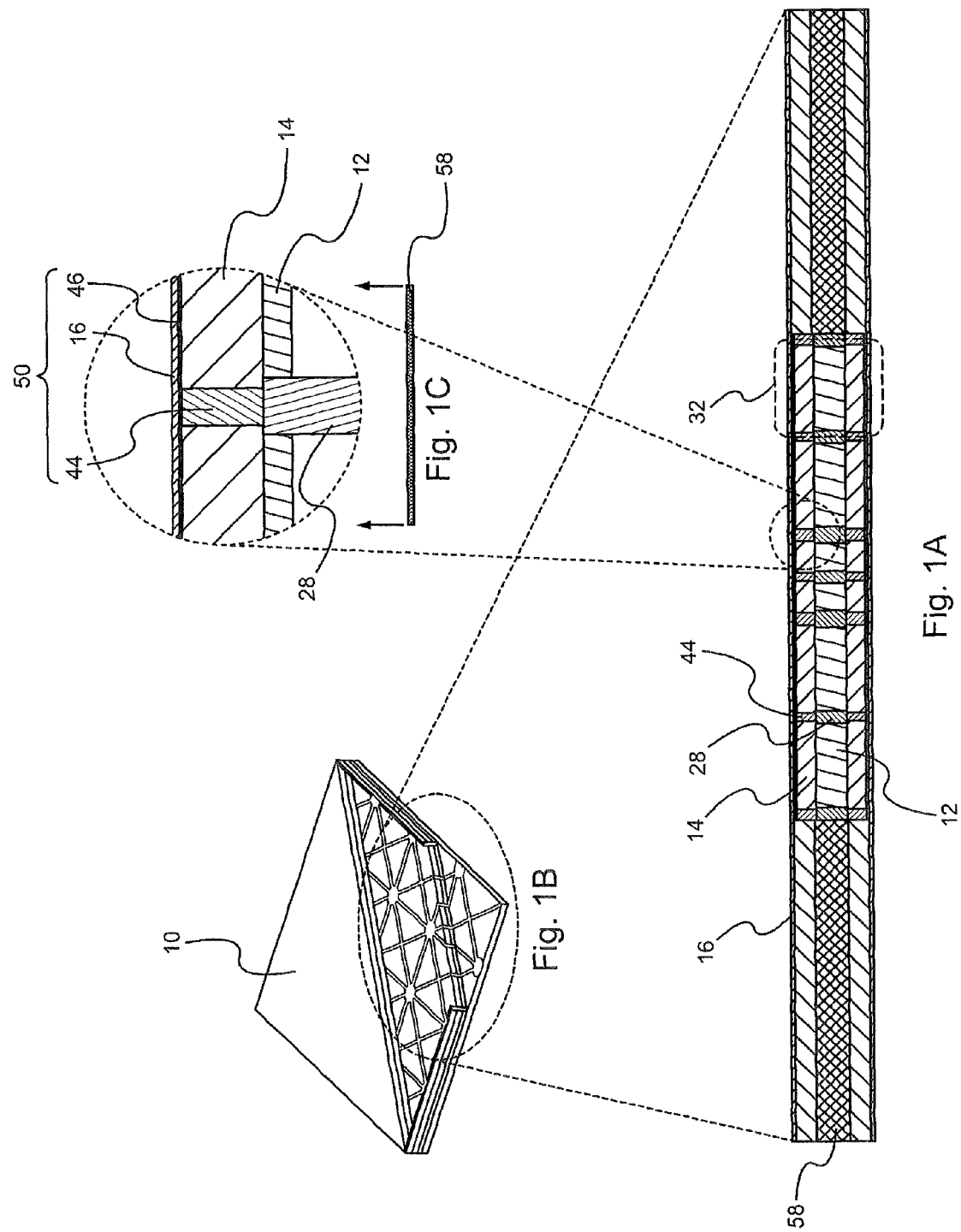

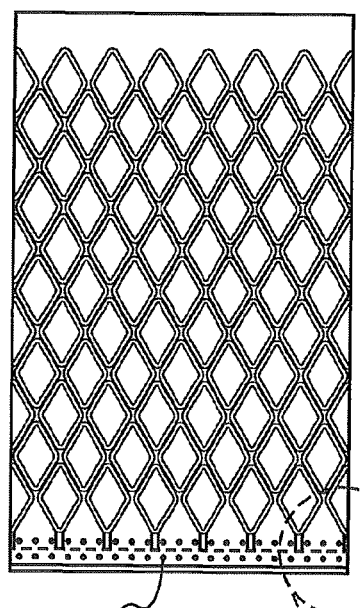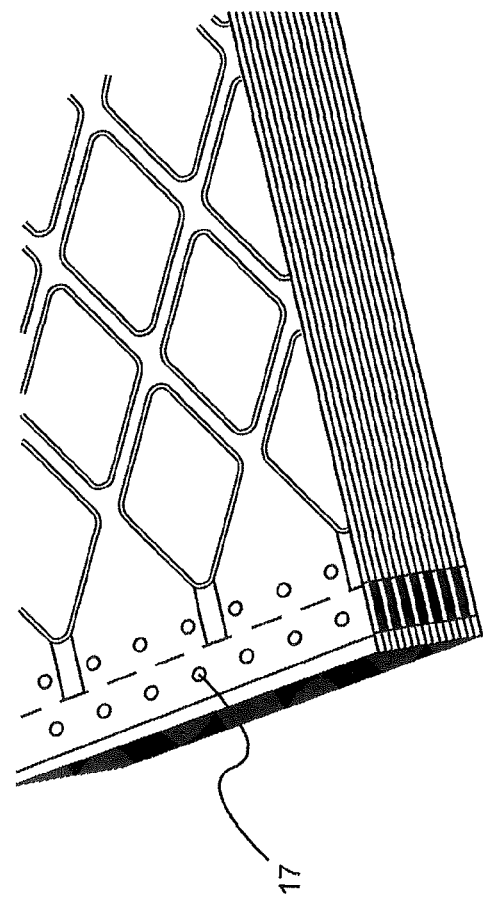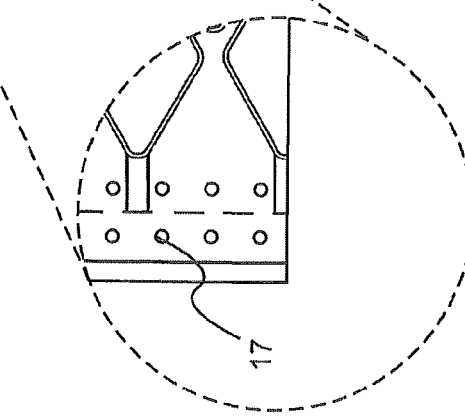

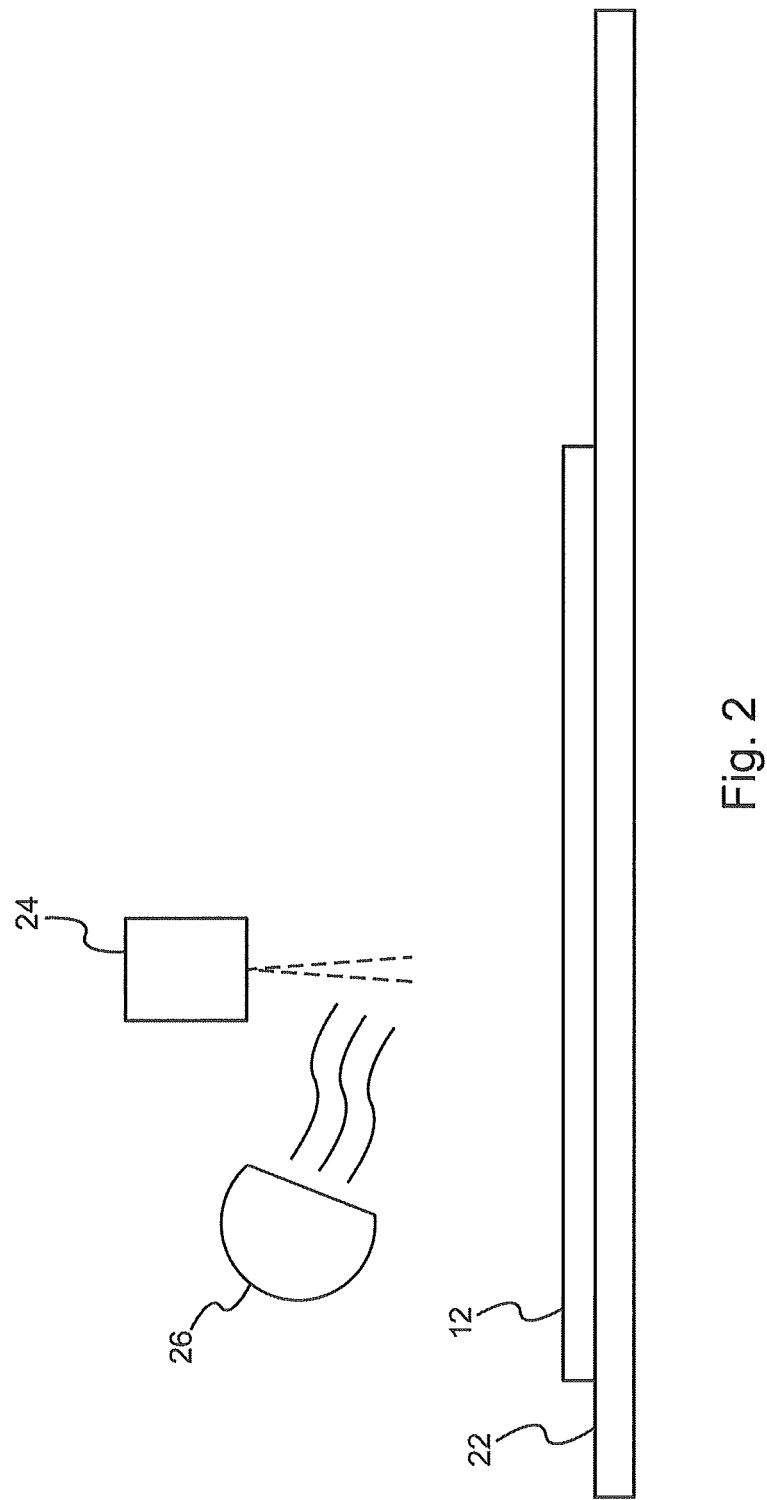

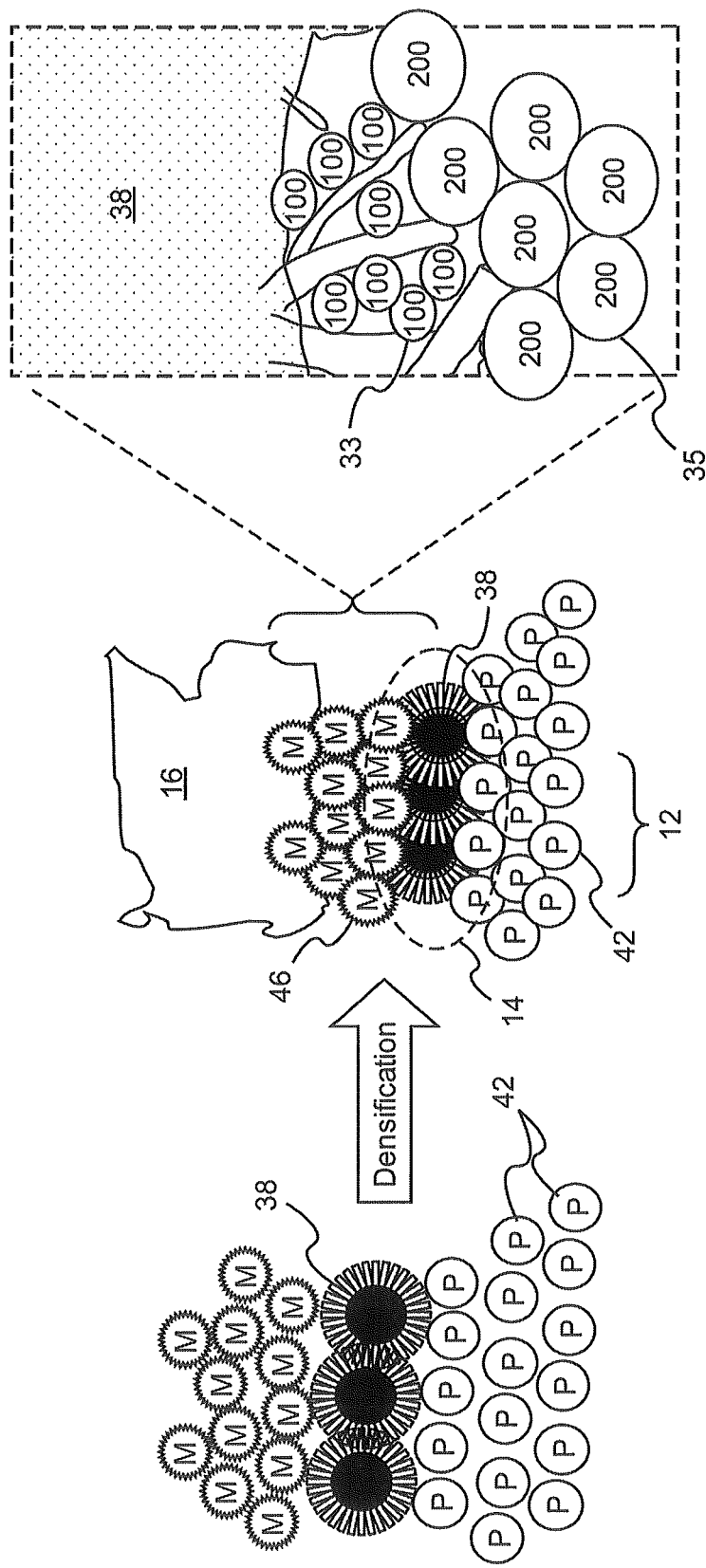

COMPLIANT ENERGY STORING STRUCTURAL SHEET

RELATED APPLICATIONS

This application is a divisional application of U.S. application Ser. No. 13/846,173, filed Mar. 18, 2013, and entitled "Compliant Energy Storing Structural Sheet," which is a divisional application of U.S. application Ser. No. 12/844,787, filed Jul. 27, 2010, entitled "Compliant Energy Storing Structural Sheet," which claimed the benefit of and priority to three commonly owned U.S. Provisional patent applications:

Ser. No. 61/228,831, filed Jul. 27, 2009, of Miller et al., entitled "Compliant sheet Capacitor," the disclosure of which is herein incorporated by reference to the extent not inconsistent with the present disclosure;

Ser. No. 61/363,104, filed Jul. 9, 2010, of Miller et al., entitled "Compliant sheet Capacitor," the disclosure of which is herein incorporated by reference to the extent not inconsistent with the present disclosure; and Ser. No. 61/364,667, filed Jul. 15, 2010, of Miller et al., entitled "Compliant sheet Capacitor," the disclosure of which is herein incorporated by reference to the extent not inconsistent with the present disclosure.

FIELD OF TECHNOLOGY

The subject matter disclosed herein relates generally to a compliant energy storing structural sheet. More particularly, this invention provides for a structural sheet that exhibits high energy density and provides structural functionality such as mechanical flexibility, puncture tolerance, and/or physical toughness.

BACKGROUND

Structural sheeting technologies are many and varied. It is commonly appreciated that durability considerations, strength requirements, and intended usage(s) of structural sheeting is often contemplated when designing structural sheeting having various material properties and/or peculiar structural features. Yet, no effort to date has placed an emphasis on integrating energy storage within structural sheeting incorporated into structural elements common to everyday commodities, electronics, transportation vehicles and buildings. The ability to store energy within structures of all types that incorporate structural sheeting could have an extensive number of applications in a broad variety of industries.

Energy storage technologies are also many and varied. The two dimensions upon which most technologies are classified are energy density and power density. An energy storage device can hold a substantial amount of energy and discharge that energy over a long period of time, which is known as energy density. Conversely, an energy storage device can also hold a smaller amount of energy, but charge and discharge that energy very quickly, which is known as power density. Both of these attributes are valuable depending upon the application. At the high end of the energy density scale are technologies like compressed air, pumped water and fuel cells. Slightly lower down are batteries, from primary batteries with alkaline chemistries, to secondary (rechargeable) batteries. At the high end of the power density continuum are capacitors, which charge and discharge on the scale of fractions of a second. Yet, of all the existing energy storage devices, little thought has been put into their mechanical strength and toughness, flexibility, and associated thickness. An energy storage device with these properties could have an extensive number of useful applications in a large variety of industries.

Thus, structural sheeting that is functional as an energy storage device and exhibits high energy density while providing structural functionality such as mechanical flexibility, puncture tolerance, and/or physical toughness would be well received in the art.

SUMMARY

According to one aspect, a structural sheet comprises an energy storage density that is greater than 10-mWh/ft2 and is capable of withstanding greater than 5-KPa stress under at least 5% strain.

According to another aspect, a structural sheet comprises: a print formed separator; a print formed electrode; and a print formed structural conductor.

According to another aspect, a separator for an energy storing device comprises: an electrically insulating porous cell; and a non-porous electrically insulating foundation grid; wherein the electrically insulating porous cells and the non-porous foundation grid are print formed.

According to yet another aspect, an energy storing structural sheet comprises an energy storing electrode that interlocks between neighboring particles and that provides suitable nano-scale tethering to the layers above and below the energy storing electrode.

According to yet another aspect, an electrode particle comprises a high porosity electrode core; and a matrix of conductive nano materials that protrude from the high porosity electrode core; wherein the electrode particle is configured to interlock with another layer in any direction to allow: high energy density; and high power with increasing thickness of an electrode layer.

According to yet another aspect, an energy storing structural sheet comprises a patterned current bus that is print formed onto a non-porous foundation layer that isolates porous separator cells mechanically and prevent electrolyte transport.

According to yet another aspect, an energy storing structural sheet comprises a patterned insulated grid that is print formed onto a non-porous foundation layer that isolates porous separator cells electrically, and mechanically and prevent electrolyte transport.

According to yet another aspect, an energy storing structural sheet comprises an electrically conducting current carrying layer that is print formed over a sub assembly that comprises a separator, a foundation, an electrode, and a current bus.

According to another aspect, an energy storing structural sheet comprises a first sub assembly that is print formed onto a substrate, wherein the first substrate is mismatched to the first sub assembly thermal properties for easy dismounting at the end of a process line.

BRIEF DESCRIPTION

The subject matter which is regarded as the invention is particularly pointed out and distinctly claimed in the claims at the conclusion of the specification. The foregoing and other features and advantages of the invention are apparent from the following detailed description taken in conjunction with the accompanying drawings in which:

FIG. 1A depicts a perspective cutaway view of a structural sheet for storing energy and providing fault tolerance in accordance with one embodiment;

FIG. 1B depicts a layered view from the top of the structural sheet with the device layers shown cutaway in accordance with one embodiment;

FIG. 1C depicts an intersection of a foundation and current bus walls in accordance with one embodiment;

FIG. 1D depicts an end pin out for a multi-layered stack of individual devices in accordance with one embodiment;

FIG. 1E depicts a close-up view of the pin out in accordance with one embodiment;

FIG. 1F depicts a perspective view of the structural sheet with the pin out connector layer in accordance with one embodiment;

FIG. 2 depicts a step of applying a separator layer to make the sheet of FIGS. 1-2, in accordance with one embodiment;

FIG. 4A depicts a nano-scale representation in the first step of forming the interlock between the separator layer of FIG. 2 and the electrode layer of FIG. 1 and a cap layer of a current collector in accordance with one embodiment;

FIG. 4B depicts a nano-scale representation of the interlock between the separator layer of FIG. 3 and the electrode layer of FIGS. 4A-4C and the cap layer of the current collector in accordance with one embodiment;

FIG. 4C depicts a nanoscale representation of the detailed interlock between the electrode and the cap layer of the current collector layer in accordance with one embodiment;

DETAILED DESCRIPTION

Figure 3A:
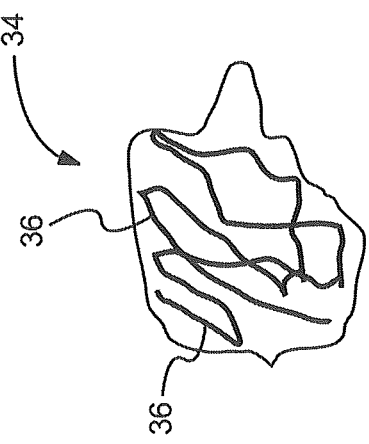
FIG. 3A depicts a representation of the first of two stages of creating electrode in accordance with one embodiment.

A detailed description of the hereinafter described embodiments of the disclosed apparatus and method are presented herein by way of exemplification and not limitation with reference to the Figures. Prior to the introduction of the Figures, several phrases used herein will be defined.

"Print forming" is defined as any direct contact or non-contact marking technology that is recognizable to one experienced in the field of printing and electronic printing.

"Indirect print" is defined as any non-contact print forming technology where individual droplets of marking material (ink) are used as markers on a substrate or material or in-flight. At least one of the technologies known as spray (ultrasonic or aerosol), ink-jet, airbrush are typically used alone or in combination with other print forming technologies.

"Direct print" is defined as any direct contact print forming technology where the physiochemical nature of the substrate (receiving surface) and a marking device such as a nano imprinting, drum, roll, bar, slide (transfer surface) jointly participate in establishing the amount of marking material (ink) transferred and the resulting properties of the final printed film. At least one of the marking technologies commonly known as screen print, gravure, flexographic, nano imprinting or draw bar are typically used alone or in combination with other print forming technologies.

"Nanoscale interlock" is defined as the pinning of near surface print formed thick-film materials through physical interlacing and subsequent interactions between high aspect ratio particles or polymeric materials on a nanoscale. Said pinning may or may not include electron transfer common to chemical bond formation. Typical film based geometric aspect ratios (z verses the x-y plane of films) of the inter-locked materials pinned are at least 1:1 where higher aspect ratios are desired and at least 3:1 may be preferable. The intent is to build physical legs of high aspect ratio with subsequently high surface areas into the receiving or transferred surfaces or both. Typical length scales of the interlacing frequency within the x-y plane of the film also termed the interval lengths are typically 10-nm to 300-nm but may be as much as 1-micron. Smaller scales are common to chemical bonding which may or may not be solicited in our devices.

"Large scale interlock" is defined as the near surface pinning of print formed thick-film materials at interval lengths exceeding 1-um. When such large scale interlocks include high aspect ratio legs a desirable interlock may still be formed provided that the total surface area gain is suitable. Devices when built as layered structures without high aspect ratio interlacing are commonly referred to as laminated structures with or without an adhesive present. A high aspect ratio large dimensioned leg with suitably high surface area is feasible and included within this invention.

"Ring-seal" is defined as a special case of interlocking between at least two materials utilizing nanoscale or large-scale or both interlocking mechanisms. The intent is to form a concentration gradient between the two materials using print forming manufacturing technologies. The result is the formation of a volume element comprised of a known concentration of the respective starting materials. In addition to controlling x-y concentration profiles, z-axis profiles may also be controlled by print forming. A representation of the ring-seal is depicted within FIGS. 6A and 6B and will be described herein below.

"Nanocomposite" is defined as a physical interlacing between dissimilar materials on a nanoscale typically sub-micron in dimension. For printed films, maximizing weak physical interactions within multi-layered print formed materials by increasing the effective contact area with high aspect ratio legs and by reducing the length scale of the interlocking frequency in the x-y plane to nanoscale is a desirable aspect of the embodiments described herein. By so doing, homogenous composite like properties are possible between films of highly heterogeneous print formed thick-film materials.

Referring now to FIGS. 1A-1F, an embodiment of structural sheet 10 for storing energy and providing fault tolerance is shown. The sheet 10 may be made or manufactured using print forming processes. Each of the components of the sheet 10 may be manufactured with a print formed process. Both direct printing and indirect printing processes are contemplated. The sheet 10 may have an energy storage density that is greater than 10-mWh/ft2 and is capable of withstanding greater than 5-KPa stress under at least 5% strain. The sheet 10 may be made from one or more sub assemblies 18, 20 that are print formed onto a substrate or substrate 22. The substrate 22 may be mismatched to the thermal properties of the sub assemblies for easy dismounting the sub assemblies from the substrate at the end of a process line. The substrate 22 may be a tempered glass, or a SS web, or a consumable carbon based veil for example.

In general, the batch processed sheet 10 depicted in FIGS. 1A-1F is fabricated by first print forming two sub-assemblies, then dismounting the two sub-assemblies from the substrate 22 or substrates, then loading with electrolyte that is compatible from the foundation side then adding a seaming plasticizing agent to the foundation side then aligning the two sub-assemblies with their foundations facing one another and sealing by calendaring the two sub-assemblies into a single sheet device 10. It should be understood that the sub assemblies may be identical sub assemblies. The sub assemblies may be dismounted from the substrate 22 and aligned foundation-to-foundation and seamed into the energy storing structural sheet 10.

The sheet 10 may include a print formed separator layer 12 that is located between two print formed electrodes 14 and current buses 44 and two electrode cap layers 46 and two print formed current collectors 16. An electrical pinout 17 or connection plane may be print formed onto the current collector 16 to output energy for external distribution that is stored in the sheet 10 or input energy to charge the sheet 10. A planar interconnection enables higher cycling frequency when connected to a planar thermal heat sink (not illustrated). The separator layer 12 is shown as the middle layer of the sheet 10. For symmetrical builds, the print formed current collector 16, electrode 14 and current bus 44 ensemble above and below the separator layer 12 are the same. Variations to a symmetrical build are feasible for incorporating hybrid or battery technologies into the sheet. When the layering above and below are the same, the sheet 10 may be created by printing the above sub assembly and the below sub assembly on the substrate 22 as shown in the cutaway perspective view of FIG. 2. In one embodiment, once each of the steps to create the two sub assemblies have been applied, the above sub assembly and the below sub assembly may then be folded along a print formed perforated crease 56 that serves as an alignment feature together to form the completed sheet 10.

Referring now to FIG. 2, a possible first step of making the sheet 10 is shown. This step first may indirectly print the porous separator film 12 onto the substrate 22. The separator film 12 may be an electrically insulating material made from a Cellulose Triacetate (CTA) solution. The solution may be a 1.67 wt % CTA solution, for example. However, it should be understood that other CTA concentrations are contemplated. In addition to the CTA, the solution may include other compounds such as Chloroform, Acetone and Methanol. The separator film 12 compound may be derived from an ink solution that is printable by indirect printing onto the substrate 22. Furthermore, the substrate 22 may be glass or any other appropriate flat surface that would be apparent to one skilled in the art.

The separator film 12 may be formed using an indirect print by being uniformly sprayed onto the flat substrate 22 by known means. One or more spray layers may be applied and interlaced along the surface such that the separator film 12 is uniformly formed. A heat lamp 26 may be utilized between the glass and the nozzle 24 in order to cure the sprayed solution as it is being transferred between the nozzle 24 and the substrate 20. This curing may help define the porosity and elasticity of the final separator film 12.

Furthermore, many embodiments are contemplated for performing the method of applying the separator film 12. Those skilled in indirect print forming processing are familiar with these methods to control the printed thick film properties of various materials. Thus, the pores and the elasticity of the separator 12 are tunable by the print forming of the separator 12.

All of these parameters may be changed with the goal of creating a separator film 12 having a thickness between 5-40 microns that is porous, having well defined pore structures demonstrating suitable dielectric properties for the voltage range at thicknesses of interest. The pores may be torturous and have an effective length that is 2 to many times greater than the true thickness of the separator 12. The pores may further be utilized to enable proper meshing with the electrode layers 14, described herein below. The separator film 12 may incorporate encapsulated particles such as ceramics or conductive materials to reduce the propensity for dielectric breakdown. The porous separator 12 may further incorporate carbon nanotubes or nano-fiberous materials at a concentration density that is below the percolation threshold that may also entangle with the electrode layer 14 on either side of the separator film 12 such that the mechanical strength between the two materials is improved significantly. Dissimilar nano-particles may be used to build torturous pores. Furthermore, while spraying using the nozzle 24 is shown in FIG. 3, other embodiments are contemplated for printing the uniform separator film 12 onto the substrate 14. While one of the embodiments contemplated includes the separator film 12 being used with the sheet 10, the separator film 12 may also be manufactured and sold as a sub-assembly unit for other sheets (not shown) or purposes. Thus, energy may be storable in the separator 12 for electrical double layered capacitors.

Referring still to FIG. 1, the sheet 10 may further include a patterned non-porous foundation 28 that is printed over the separator layer 12 on the substrate 14 in a manner that enables the closing or blocking of the immediately underlying porous separator film. The foundation 28 may be directly printed onto the porous film of the separator film 12 in such a matter to enable to conversion of the porous film into the patterned non-porous foundation 28 grid without impacting the uniformity of thickness throughout the separator surface. The foundation 28 grid may be made such that massively parallel porous separator cells 32 are formed that are separated by the non-porous foundation 28. The foundation 28, in conjunction with the separator film 12, may facilitate stress management within the sheet 10, helping to allow the sheet to be mechanically flexible and also aid in handling or mounting without damaging the electrical properties of the device. Further, the cells may provide puncture tolerance to the sheet 10.

The foundation 28 may be another CTA solution. However, the solution for the foundation 28 may have a much greater CTA wt % as it is applied by a direct print method. For example, the solution may be 9% CTA. The foundation 28 may be an ink solution that is indirectly printable on the substrate 22. The ink formulation may include a dilute CTA solution like previous discussed for the separator film. This precise indirect printing is accomplished by moving the nozzle or substrate in order to achieve the patterned desired. The pattern in which the foundation 28 is applied is a number of boxes with X's through them to create four triangular cells 32 per box. Thus, the triangular cells 32 of FIG. 2 are actually the portion of the separator film 12 that the foundation 28 was not applied. The triangular cells 32 therefore still have the porous surface of the separator film 12 after the foundation 28 has been applied, while the outline of the cells 32 and the outline of both of the sub assemblies 18, 20 may comprise the nonporous foundation 28. The cells 32 may be fault tolerant, self healing structural cells 32 in that a puncture of one cell may not affect the rest of the cells 32 of the sheet 10. The grid created by the cells 32 and the foundation 28 and current bus 44 may enable a puncture tolerance and mechanical toughness to the plurality of cells 32. It is understood that the absolute dimensions of the cell 32, foundation 28 and current bus 44 and ratios of a grid defined by the foundation 28 or current bus 44 to the cell 32 can be varied throughout the dynamic range of the type of printing technology used and more practically, greater than 5 microns widths for the grid components and greater than 25 micron widths for the cell.

While triangular cells 32 are shown in the Figures, it should be understood that other shaped cells are also envisioned. For example, circular, rhombus, rectangular cells, square cells, or any other appropriately shaped cells may be utilized. The purpose of the cells 32 is to isolate damaged cells during processing, handling or otherwise and to provide additional strength to the sheet 10. Thus, if a single of the cells 32 becomes punctured, the undamaged portion of the sheet 10 may function normally. It should be further understood that the size of the sheet 10, and the cells 32 may vary according to the requirements of the specific application. In the embodiment depicted in the Figures, the two dimensional area of each cell may be about 31 mm$^2$. Thus, the length of each "box" of four triangular cells 32 may be about 12.5 mm in one embodiment. It should be understood that the actual dimensions of each cell can vary and that typically the minimum dimension is 0.01 mm to 0.1 mm and typically the maximum dimension is 0.1 mm to 20 mm. Finally, the repeat unit of the sheet 10 is at the dimensions of a single cell 32. As such, unique designs within the sheet 10 can be envisioned during the fabrication process such as presence and absence of cells 32 to match a application or the cutting out of patterns such as an article of clothing or perhaps a donut shape for rail gun or coil gun application.

Once the foundation 28 has been applied, the substrate 22 is ready for the application of the electrode layer 14. The electrode layer 14 may be made by a separate electrode preparation process, partially shown in FIGS. 3A-3C. To prepare the electrode solution, first a nano mix may be added to a gelable solution that would become a sol-gel. A nano mix may consist of any nanoscale materials or blends. For example, a polymers, metals, oxides of metals, ceramic or other type material may be used with the nano mix. The nano mix may be a blend of nano materials such as carbon nanotubes (CNT) and fat, long aligned CNT bundles that resemble yarn when viewed with a SEM microscope. If carbon is used as the nano material, the carbon density may be greater than 0.5-g/cc. For example, the carbon density may be between 0.5 and 2 g/cc. The nano material should preferably have high strength, low density, a high aspect ratio (length vs. diameter), and may be fusible with pulse radiation or other means. The gelable liquid that may be comprised of precursory materials for aerogel formation together with the nano mix may then be gelled and then dried into an aerogel in a similar manner to the way in which pure sol-gel is turned into an aerogel from a liquid solution. Once in sol-gel form, the gelled system may be further dried in the similar manners to which sol-gel is dried into aerogel. The drying may be an air dry process or a super critical fluid $CO_2$ process that is known to those skilled in the art.

Once the drying is completed, a hardened porous material may result from the aerogel and nano mix blend. The porous properties of the hardened materials can be adjusted by varying the ratio of the constituents within the nano blend and the properties of the starting sol-gel. Pores ranging from macropores (greater than 50 nm) to micropores (under 2 nm) are thus feasible within the hardened materials. The hardened material at this stage may not be carbonized or fully conductive. While the nano-materials may be conductive, the hardened material may still include particles other than carbon most notably the aerogel component. The hardened porous material may then be pyrolyzed, for example, in order to produce a substance that is richer in carbon after the resulting volatile moieties of the aerogel are oxidized off during the pyrolysis process. The pyrolysis may result in a material that is shrunk from its original size and may involve a conditioning environment during or post-pyrolysis to induce unique properties to the nanomix or aerogel components.

Figure 3B:
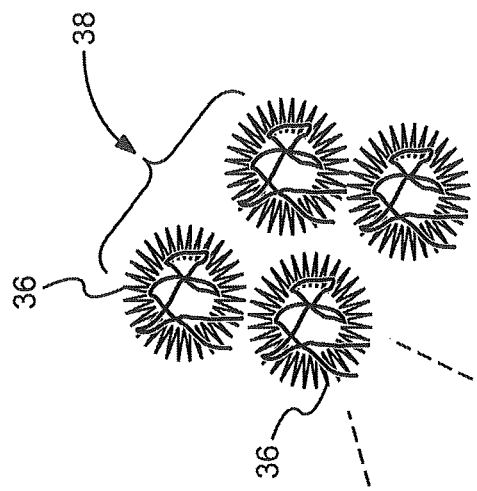
FIG. 3B depicts a representation of the second of two stages of creating electrode in accordance with one embodiment.
Figure 3C:
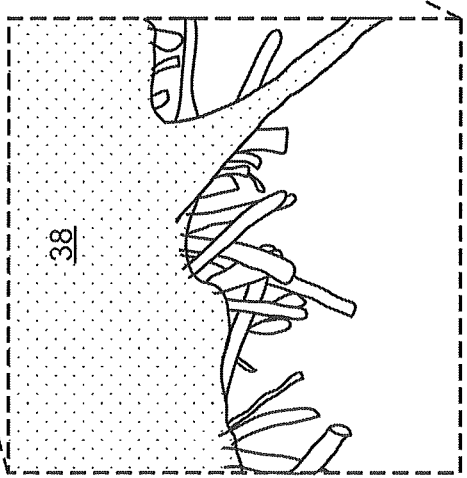
FIG. 3C depicts a close-up microscopic image of the surface of an electrode particle in accordance with one embodiment.

Referring still to FIGS. 3A-3C, a representation of a pyrolyzed material 34 is shown. The pyrolyzed material 34 is shown having the nano mix 36 interspersed throughout. The pyrolyzed material 34 may further be a highly porous material. The pyrolyzed material 34 may then be ground into a powder, depicted by electrode particles 38. The grinding process may include a cryogenic ball milling process. However, other processes are contemplated such as room temperature milling. Each particle is designed to contain a mixture of macropores, mesopores and micropores in order to tune the mass transport properties and charge carrying capacity of the particles.

As shown in FIGS. 3A-3C, once the powdered electrode particles 38 are created, the electrode particles 38 may have a high porosity electrode core and a matrix of conductive nano materials that protrude from the high porosity electrode core. The electrode particles 38 may be a "hairy particle," where this matrix of long nano mix components sticks out like hairs around the carbon blend of materials that predominantly makes up the particle. The "hairy" electrode particle 38 may be an energy storing electrode that is capable of interlocking with neighboring particles and provides suitable nano-scale tethering to the layers above and below the electrode 38 when applied to the sheet 10. The electrode particle 38 may thus be capable of interlocking with another layer in any direction to allow high density and constant power with increasing thickness of an electrode layer that comprises a plurality of the electrode particles 38. The electrode particle 38 may have optimal mass transport of electrolyte between the particles while also containing high surface area microstructures, for example of the aerogel, within.

Once the electrode particles 38 are created in powdered form, this powder may be turned into an ink by mixing the powder with a suitable rheological modifier such as hexane or another liquid organic material such as alcohol. The powder may be combined with the coupling agents, rheological agents with ultrasonic dispersion. The ink may be combined with or without a dispersing agent included, such as a surfactant. The resulting electrode ink may provide a linear relationship between the printed electrode's 14 thickness and energy and power density, and also contain the nano mix "hairs" which facilitate in the bonding and anchoring of the electrode to the porous separator. Furthermore, the energy storing electrode may be preloaded with electrolyte prior to printing, and either before or after becoming an ink.

The electrode ink may be applied to create the electrode layer 14. The electrode layer 14 may be applied to the substrate 22 over only the porous separator film cells 32. The ink may thus be sprayed using an indirect print. The electrode layer 14 may be applied over the separator film 12 in more than one layer. The hairy nano material of the electrode layer 14 is configured to nanoscale interlock between adjacent particles and with the particles of the separator film 12 in such a way to assure a high percentage of the protruding nano materials being intercalated within the previous separator film 12 pores. Temperature and pressure treatment may be utilized in order to form a highly entangled interfacial zone between the separator film 12 and the electrode layer 14. For example, after each layer of the electrode is applied, the electrode layer 14 may be flash cured with a pulsed radiation light source. While the process for applying the electrode layer 14 may be a wet process as described hereinabove, dry processes are also contemplated. For example, the electrode layer 14 may be electrostatically deposited onto a transfer drum then directly printed onto the separator film 12.

Referring now to FIGS. 4A-4C, a molecular view is shown of how the electrode layer 14 is interlocked with the separator film 12 and the current collector particles 16 (described hereinbelow). More particularly, the electrode particles 38 are shown mixed within a printed film and then fused with collector and separator particles 42. One embodiment assumes a plasticized separator particle (gel like surface) entrapping the nanomix hairs of the electrode particles. However, other embodiments that form nanoscale and large scale interlocking are possible. A schematic representation of nanoscale interlocking using 100-nm beads 33 overlaid on an invented hairy particle 38 are illustrated to scale in FIG. 5C In the illustration, 200-nm beads 35 are shown not to be able to interlock with the particles 38.

The current bus 44 may then be applied to the substrate 22 between the individual electrodes 14 and directly over the previously applied foundation 28 once the electrodes 14 have been applied. The current bus 44 may be print formed onto a non porous foundation layer that isolates porous separator and active cells 32 electrically and mechanically and prevents electrolyte transport, such as the non-porous foundation layer 28. The current bus 44 may be dimensioned for optimal thermal, mechanical and current carrying needs of an application. The ratio of the current bus to the cell 32 size and thus the porous separator 12 may be configured for optimal mechanical, thermal, and electrical properties. The current bus 44 may be part of a current collection ensemble 50 that comprises the current bus 44, the current collectors 16. Thus, the current bus 44 may be applied over the foundation 28 in the patterned area. The current bus 44 may be deposited in such a way that the nanomix materials of the electrode particles may become intercalated together with the current bus 44. The current bus 44 may be sintered and cured, depending on the temperature and pressure requirements of the application process. The degree of densification of the current bus 44 may be a carefully controlled process parameter. Upon final densification, the current bus 44 may serve as part of a pressure tight seal provided by the current collection ensemble 50. This seal may serve to prevent cross contamination between adjacent cells. The current bus 44 may be created with an ink, such as a Dupont silver, copper, nickel, aluminum or carbon ink. The current bus 44 may be conductive, and serve to transport currents to and from the input and output pins 18. Alternatives such as none conductive ribs that electrically isolate each cell and replace the current bus 44 or conductive materials doped polymeric materials are possible.

Figure 5B:
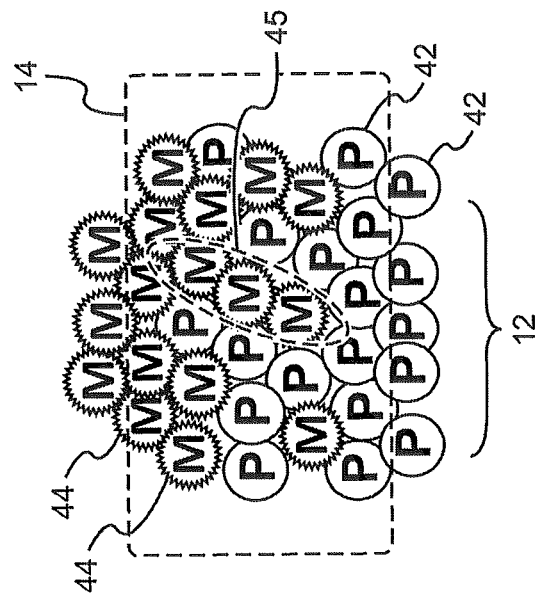
FIG. 5B depicts a representation of the second step of formation of a ring seal of the structural sheet in accordance with on embodiment.
Figure 5A:
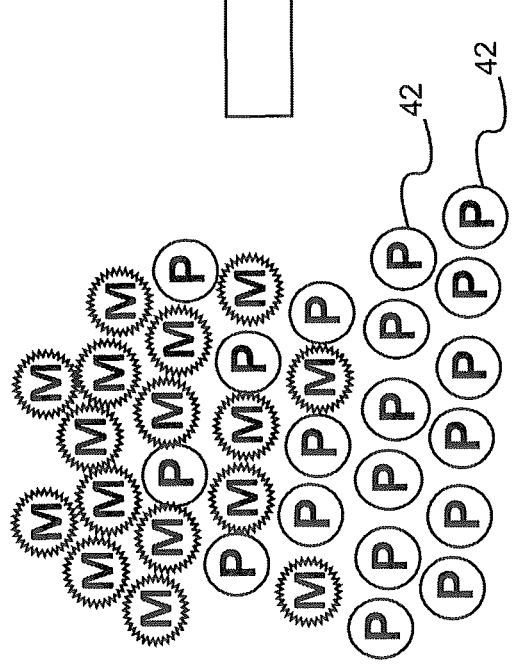
FIG. 5A depicts a representation of the first step of formation of a ring seal of the structural sheet in accordance with one embodiment.

Referring to FIGS. 5A and 5B, the patterned current bus 44 may be interlocked with the non-porous foundation 28 with a ring seal. To accomplish the interlocking by print forming two approaches are described. Option 1, a gradient is dynamically formulated within two dissimilar inks labeled "M" and "P" respectively. A printed gradient is first formed within a detached vessel and is known to those familiar with continuous flow wet processing. In summary, "M" is added to the vessel that contains a high percentage of "P" while the vessel containing "P" is being extracted and printed onto the device by the printing apparatus. In so doing, "M" is enriching while "P" is being diluted over the print period. The depth of the gradient formed within the z-axis of the build is determined by relative flow rates of the "M" and "P" constituents. For shallow thin-film builds the fusing may be completed at the end of the mixed film illustrated as a "volume element" in FIGS. 5A-5B. More specifically, this may be accomplished with pulse radiation if the inks are composed principally of nanomaterials and polymeric dispersions. Yet another means (option 2) of formulating the gradient is to encapsulate the conductive nanomaterial, M with polymeric material, P that is compatible with the foundation 28 material. In this case a gradient is still formed with encapsulated M and a dispersion of P. Yet another option is to utilize the deposition properties of indirect print technologies such as by a spray application. Spray applicators can be designed to have a wide range of concentration gradients within the deposition cone of the nozzle. By tuning the overlapping and deposition properties of two separate nozzles 24 for solution M and P respectively, a gradient of M and P can be accomplished as a function of the deposition thickness and time. As with the former gradient, curing frequency is adjusted to assure complete cure of the films formed due to a complex transmissivity function as a function of thickness. The aspect ratio and thereby the properties of the legs, 45 developed are correlated to the cone geometrics, relative concentration of M and P, film forming properties of M and P, and the deposition rates of the two nozzles.

The current collection ensemble 50 may further include a cap layer 46. The cap layer 46 may be printed over the entirety of the substrate 14 with a wet or dry process. Shown in FIGS. 4A-4C is the cap layer 46 being applied over the electrode layer 14. The cap layer 46 may be formed by placing nanomaterial over the electrode such that once fused with pulse radiation or other suitable means, the mechanical properties of the outer 0.3 to 3 microns of the electrode material become a cap that is infused with conductive nano mix of the electrode. The cap layer 46 may work in conjunction with the current bus 44 and current collector 16 to form the pressure tight seal preventing cross contaminating between adjacent cells. The cap layer 46 may be overlaid in such a manner to assure good intercalation, particularly with the previous current bus 44 and electrode layer 14 with which the cap layer 46 may contact. The cap layer 46 may be composed of a dispersed solid consisting of micron sized pure metal particles or alloys with nano materials such as copper, gold, carbon, or silver. The purpose of the cap may be to enable thick-film build up while offering low processing temperature and to meet desired electrical and mechanical specifications after densification. The electrode particle 38 may further form a green state build after application of the electrode particles 38 and the cap layer 46 that, upon sintering and shrinkage of a containment chamber for the electrode particle 38, allows the release of entrapped gasses through the open porous structure of the chamber.

A third portion of the current collector ensemble 50 may be the plurality of current collector layers 16. The combination of the cap layer 46 and the electrically conducting continuous current collector layers may be configured to collect current, balance current between adjacent cells and transport it in a z-axis to an adjacent device. FIGS. 4A-4C depict a cross sectional view of a current collector and cap interlock to the electrode in accordance with one embodiment. The goal of the current collector layers 50 may be to build up metallic current collecting capacity and mechanically support the arrayed and sealed capacitive cells beneath. The current collector layers 50 may provide that the sheet is able to withstand over 0.5 psi, and preferably between four and ten psi, of internal pressure without breaking down or harming the energy storage capabilities. The current collector ensemble 50 may collectively prevent the electrolyte from escaping out of the sheet 10 during activation. The current collector ensemble 50 may also be a moisture and environmental barrier. As such, the current collector ensemble 50 may be the final layers applied to the sheet 10 prior to assembling the fully printed device.

A third portion of the current collector module 50 may be one or more current collector layers 16. The current collector module 50 may be an electrically conducting current carrying layer 16 that is print formed over a sub assembly that comprises the separator 12, the foundation, 28, the electrode 14 and the bus 44. The material of the electrically conducting current collector may assure an interlocking between the electrically conducting current collector 16 and the electrode 14. The combination of the cap layer 46 and the electrically conducting continuous current collector layers may be configured to collect current and transport it in a z-axis to an adjacent device. The goal of the current collector layers 16 may be to build up metallic current collecting capacity and mechanically support the arrayed and sealed capacitive cells beneath. The current collector layers 16 may provide that the sheet is able to withstand over three psi, and preferably between four and ten psi, of internal pressure without breaking down or harming the energy storage capabilities. The current collector layer 16 may be fused by pulse radiation over the cap 46. The current collector layers 16 may collectively prevent the electrolyte from being pumped out of the sheet 10 during activation. The current collector layers 16 may also be a moisture and environmental barrier. The current collector layers 16 may be the final layers applied to the sheet 10 prior to assembling the fully printed device. The current collector layers 16 and the cap 46 may be predominantly z-axis conductors. This z-axis conduction may be further provided by a high strength conductive carbon veil that is configured to enhance the mechanical properties and increase strength.

Further contemplated is an external current bus (not shown) that is coupled to the outside of the two identical sub assemblies 18, 20. The external current bus may have a geometry that is parallel to the internal current bus 44, and the foundation layer 28. The external current bus may further be in operable communication with the pinout 17.

Assembling the batched processed sheet 10 from the printed substrate 22 may comprise several steps. First, a printed sub assembly may be dismounted from the substrate 22. This dismounting may be accomplished by a cold finger, roller or refrigeration. For example, cooling may shear the physical bonds between the separator and foundation film 12, 28 and the substrate 22 so that the sub-assembly or the pre-assembled sheet 10 may be carefully removed from the substrate 22. The second sub assembly may be dismounted from the same substrate 22 or a different substrate (not shown) in a similar manner. The sub assemblies may be dismounted and stored in suitable packaging material for further processing.

Once the batched processed pre-assembly sheet 10 or sub assembly is separated from the substrate 22, the sheet 10 or sub assembly may be flipped 180° such that the collector layers 50 are facing the substrate 22 while the separator layer 12 is faced upwards. The reversed pre-assembly for sheet 10 or sub assembly may then be inserted into a vacuum oven or other environmentally controlled chamber for a predetermined amount of time. This temperature and time may help to drive off residual solvents from the carbon electrode materials and activate the electrode within the sheet 10. Once removed from the oven or other environmentally controlled chamber and cooled to room temperature, a room temperature ionic liquid (RTIL) electrolyte may be applied to the sheet 10. The RTIL may be applied directly to the triangular cell area 32. The RTIL may be allowed to soak for a predetermined time period, for example for thirty minutes to fill in any of the unfilled pores of the separator film 12 and electrode layer 14. Once the soaking or wetting has been completed, excess RTIL may be removed with, for example, an absorbent roller. Common RTIL electrolytes may be utilized assuming compatibility with the various materials used in the sheet 10. As such, phosphorous hexafluoride, $PF_6$ anion's are preferred over boron terafluoride, $BF_4$ anions for CTA based devices. In addition, the cation selection is critical for similar reasons. For CTA, a proprietary cation is preferred in combination with the $PF_6$ anion. In the case of CTA, aqueous systems are not compatible. Furthermore, the electrolyte may be a solid electrolyte with different application processes that may be known to those skilled in the art.

Once the pre-assembled sheet 10 has been loaded with electrolyte on the substrate 22, the sheet 10 may treated with a seaming agent by print forming and then folded along a line of perforation or crease to enable alignment between the two sub-assemblies. A seam 58 may be formed between the two sub assemblies by applying a plasticizing agent along the seam to attack the CTA of the separator layer 12 that is exposed due to the 180° rotation described hereinabove. To properly fold the sheet 10, the cells 32 and current bus grid may be properly aligned or matched up. It should be understood that while the embodiment described herein requires the folding step, other embodiments are contemplated. For example, the sheet 10 may be printed on both sides of the separator film 12, rather than requiring a folding step. It is further contemplated that each of the steps of creating the sheet 10, described hereinabove, may be done in a computerized printing process whereby lengths of the sheet 10 may be created. It is contemplated that precise roll-to-roll, (R2R) printing processes may be utilized to print lengths of the device at 1 m/s or more.

After the folding step, a sealing device (not shown) may be used to seal the grid portion and the surrounding portion of the sheet 10. The sealing device may include protrusions in the shape of the current bus grid and the surrounding portion that is around the current bus grid. This is because the triangular cells 32 of the sheet may actually protrude from the current bus grid shape channels prior to folding. Thus, folding the above sub assembly and the below sub assembly together may result in an unwanted spacing between the current bus grid of the above sub assembly and the current bus grid of the below sub assembly. The sealing device may be used to seal the current bus grid of the above sub assembly with the current bus grid of the below sub assembly, along with sealing the area around the outside of the grid of the sheet 10. Said sealing device may be an embossed roll in an R2R line that may also be heated.

Figure 6A:
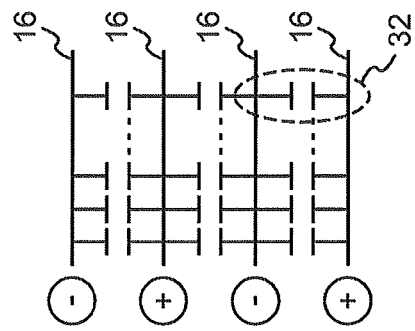
FIG. 6A depicts an equivalent circuit for a single layer of the structural sheet device with energy storage.
Figure 6B:
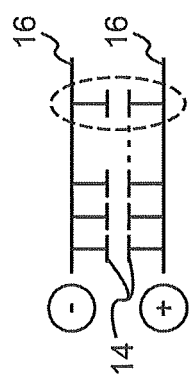
FIG. 6B depicts an equivalent circuit for a multi-layered structural sheet device with energy storage.
Figure 6C:
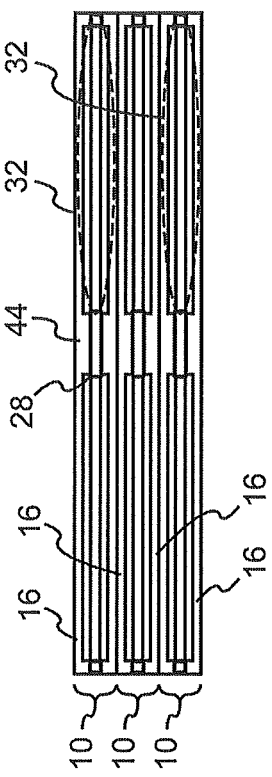
FIG. 6C depicts a cross sectional view of a single layer of the structural sheet device with energy storage that comprises the energy storing unit shown in FIG. 1.
Figure 6D:
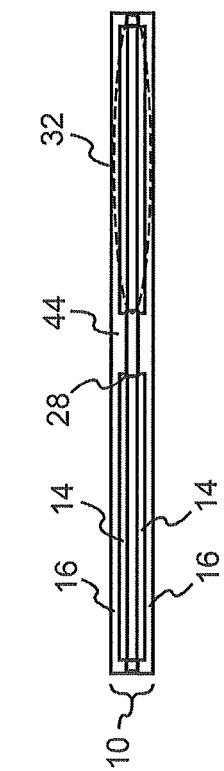
FIG. 6D depicts a multi-layered structural sheet device with energy storage that comprises a plurality of the energy storing units shown in FIG. 1, stacked together.

As previously stated, the sheet 10 may be stackable in several layers, as shown in FIGS. 6C and 6D. A single sheet 10 device, as shown in FIGS. 6A and 6B, may be extremely thin, therefore allowing several of the devices to be stacked together, as shown in FIGS. 6C and 6D, and connected in either series or parallel, thus providing more energy storage per unit length of the sheet 10. For example, an odd numbered plurality of the sheets 10 may be integrated together in series with a seaming agent. Alternately, an even numbered plurality of sheets 10 may be integrated together in parallel with a seaming agent. A filled vias may be print formed into the patterned current bus to integrate the plurality of high strengths, high energy density structural sheets and enable parallel arrangements between devices.

Further, the sheet 10 may be made to accommodate any shape or size. While the embodiment depicted in the Figures is roughly square or rectangular in shape, other embodiments are contemplated such as circular shapes, rectangular, triangular, ovular, or any other shape that would be useful in an application of the sheet 10.

Figure 7:
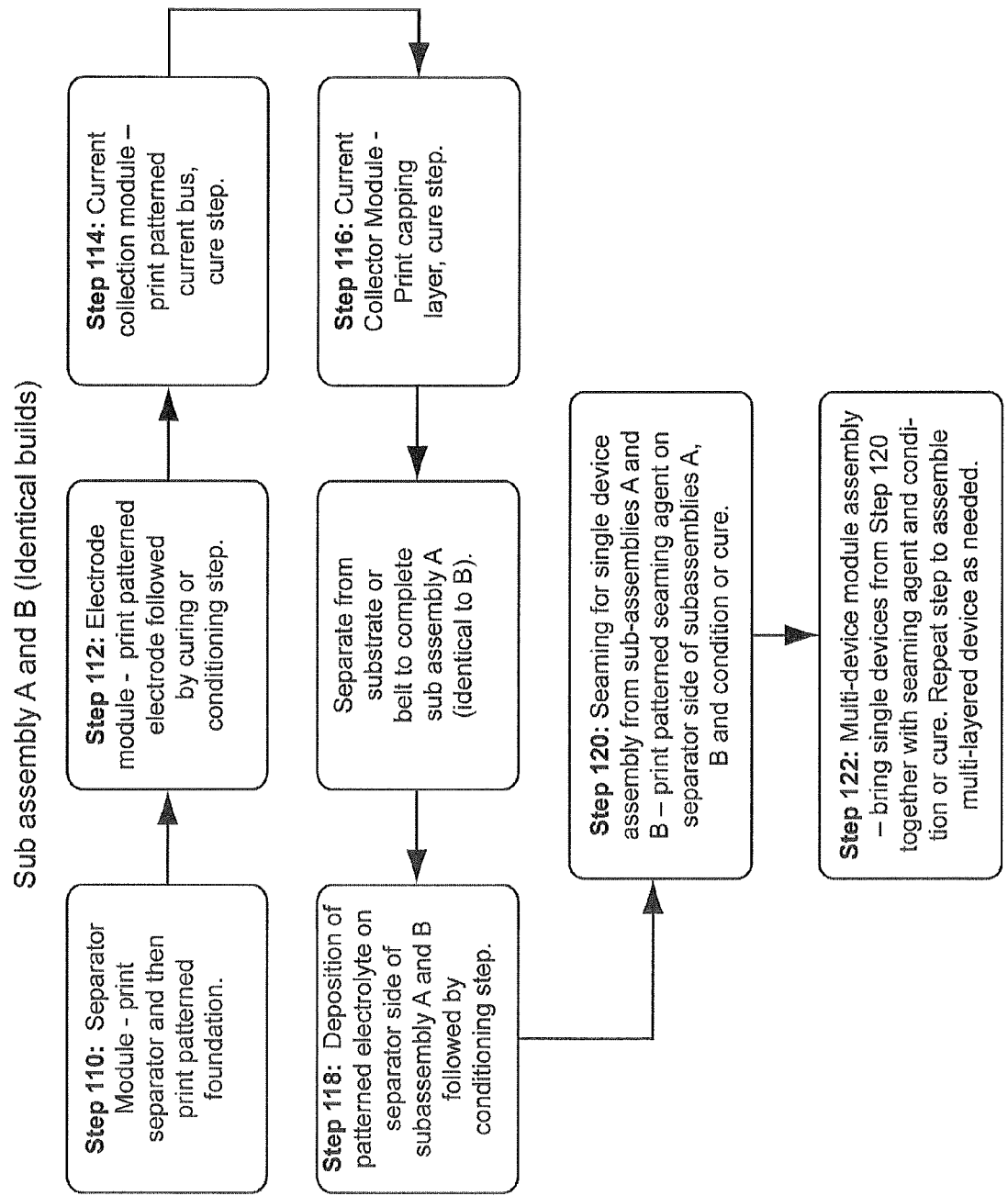
FIG. 7 depicts a process diagram for creating the structural sheet and an integrated stack in accordance with one embodiment.

Referring now to FIG. 7, a method 100 is shown for creating a structural sheet such as the sheet 10. The method 100 may include a step 110 of applying a separator module, such as the separator layer 12 and the foundation 28 to a substrate such as the substrate 22. The method 100 may include a step 112 of applying an electrode, such as the electrode 14. The method 100 may further include a step 114 of applying a current bus, such as the current bus 44. The method 100 may still further include a step 116 of applying a cap layer, such as the cap 46. Further, the method 100 may include a step 118 of loading electrolytes into the opposite surface behind the separator module. Further, the method 100 may comprise a step 120 of assembling a sheet such as the sheet 10. Finally, the method 100 may include a step 122 layering several sheets together. It should be understood that the steps outlined hereinabove to the method 100 may be done in other orders or including other steps there between that will be apparent to those skilled in the art and further described herein. It should be understood that the method 100 is presented in this order by way of exemplification.

The sheet 10 may be useful in a variety of different applications. The thin nature of the device along, with its pliability and flexibility, are advantages that may allow the sheet 10 to provide energy in many scenarios. For example, the sheet 10 may be used as an energy storage elongated "tape," that is segmented for easy disassembly or assembly in series or parallel configurations based on user choice. The sheet 10 may be used to store energy for solar photovoltaic devices, in both grid-integrated and off grid applications. It is further contemplated that the sheet 10 be embeddable in automobile frames or within advanced soldier uniforms. Still further, the sheet 10 may be used for digital camera flashes, or for cordless surgical or dental tools. Also contemplated are applications for the sheet 10 as structurally conformable or integrated into structures of weapons such as guided missiles s, aeroplanes such as unmanned aerial vehicles (UAVs) or underwater vehicles, as, decoupling capacitors underlaid on printed circuit boards, industrial or production power tools, model airplanes, cars or helicopters, high stakes packaging, military battery packs and generators, night vision goggles, portable defibrillators, embedded in building materials such as roads, concrete walls floors, insulation, barrier sheet materials or the like, hand held power tools, transmission lines wrapped in the device to integrate storage directly into the grid, fabric integrated batteries, embedding battery in electric fencing, flexible displays (newspapers or the like), medical diagnostic watches or monitors worn by patients, eco-sensors, regenerative braking for hybrid vehicles, regenerative energy capture in elevators, forklifts, motors in other devices, within laptops, as batteries embedded under the skin with medical devices, cordless phones, toys, thin film battery hybridization (RFID tags), bluetooth headsets, cell phones, marine sealed batteries, handheld video game consoles, tasers, high end flashlights, cordless lawnmowers or string trimmers, electric toothbrushes, shoes, wireless devices such as microphones, vacuums, remote sensors, elevators and docks, or the like. It should be understood that some devices require larger batteries than desirable due to the power density requirements of the device during energy consumption spikes (for example with flashes, or high energy activities on a device that does not always require high energy). In this case, the sheet 10 may be implemented as a high power density supplement within a casing, for example, to supplement the standard battery for these high power density applications. This may allow for the standard battery of the device to be decreased in size significantly.

Elements of the embodiments have been introduced with either the articles "a" or "an." The articles are intended to mean that there are one or more of the elements. The terms "including" and "having" and their derivatives are intended to be inclusive such that there may be additional elements other than the elements listed. The conjunction "or" when used with a list of at least two terms is intended to mean any term or combination of terms. The terms "first" and "second" are used to distinguish elements and are not used to denote a particular order.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A structural sheet comprising:
    an energy storage density that is greater than 10-mWh/ft2 and is capable of withstanding greater than 5-KPa stress under at least 5% strain; and
    one of: an odd numbered plurality of high strength, high energy density structural sheets that are integrated together in series with a seaming agent, or an even numbered plurality of high strength, high energy density structural sheets that are integrated together in parallel with the seaming agent.

2. The structural sheet of claim 1, wherein a filled vias is print formed into a patterned current bus to integrate the plurality of high strength, high energy density structural sheets together.

3. The structural sheet of claim 1, wherein all components of the structural sheet are print formed.

4. The structural sheet of claim 3, further comprising an external current bus coupled to the outside of the two identical sub assemblies.

5. The structural sheet of claim 4, wherein the external current bus has a geometry that is parallel with a geometry of an internal foundation layer, and wherein the external current bus is in operable communication with a pinout.

6. The structural sheet of claim 1, further comprising an electrical pinout.

7. The structural sheet of claim 1, further comprising a plurality of fault tolerant, self-healing structural cells.

8. The structural sheet of claim 1, further comprising a plurality of electrically isolated structural cells.

9. A structural sheet comprising an energy storage density that is greater than 10-mWh/ft2 and is capable of withstanding greater than 5-KPa stress under at least 5% strain, further comprising two identical sub assemblies that are print formed, wherein the first and identical second sub-assemblies are dismounted and aligned foundation-to-foundation and seamed into the energy storing structural sheet.

* * * * *